US006864937B2

(12) United States Patent
Moon et al.

(10) Patent No.: US 6,864,937 B2
(45) Date of Patent: Mar. 8, 2005

(54) IN-PLANE SWITCHING MODE LIQUID CRYSTAL DISPLAY DEVICE WITH PERIPHERAL CIRCUIT LINES FOR SHIELDING

(75) Inventors: Hong Man Moon, Kumi-shi (KR); Sang Chul Park, Kumi-shi (KR); Jae Young Chung, Pusan-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 34 days.

(21) Appl. No.: 09/892,883

(22) Filed: Jun. 28, 2001

(65) Prior Publication Data

US 2002/0044246 A1 Apr. 18, 2002

(30) Foreign Application Priority Data

Oct. 16, 2000 (KR) .................................. 2000-60821

(51) Int. Cl.⁷ ............................................. G02F 1/1343
(52) U.S. Cl. ........................................................ 349/139
(58) Field of Search ................... 345/93; 349/141, 349/54, 139

(56) References Cited

U.S. PATENT DOCUMENTS

| | | | | |
|---|---|---|---|---|
| 4,295,711 A | * | 10/1981 | Tanaka et al. | 349/149 |
| 5,151,689 A | * | 9/1992 | Kabuto et al. | 345/103 |
| 5,598,285 A | | 1/1997 | Kondo et al. | 349/39 |
| 5,956,009 A | * | 9/1999 | Zhang et al. | 345/93 |
| 6,046,711 A | * | 4/2000 | Kouchi | 345/8 |
| 6,335,770 B1 | * | 1/2002 | Komatsu | 349/38 |
| 6,806,935 B2 | * | 10/2004 | Song | 349/141 |
| 2002/0051111 A1 | * | 5/2002 | Greene et al. | 349/149 |

FOREIGN PATENT DOCUMENTS

JP 5-100637 * 4/1993

OTHER PUBLICATIONS

R. Kieler et al.; "In–Plane Switching of Nematic Liquid Crystals"; Japan Display '92; pp. 547–550.
M. Oh–e, et al.; "Principles and Characteristics of Electro–Optical Behaviour with In–Plane Switching Mode"; Asia Display '95; pp. 577–580.
M. Ohta et al.; "Development of Super–TFT–LCDs with In–Plane Switching Display Mode"; Asia Display '95; pp. 707–710.
S. Matsumoto et al.; Display Characteristics of In–Plane Switching (IPS) LCDs and a Wide–Viewing–Angle 14.5–in. OPS TFT–LCD; Euro Display '96; pp. 445–448.
H. Wakemoto et al.; "An Advanced In–Plane Switching Mode TFT–LCD"; SID 97 Digest; pp. 929–932.
S.H. Lee et al.; High–Transmittance, Wide–Viewing–Angle Nematic Liquid Crystal Display Controlled by Fringe–Field Switching; Asia Display '98; pp. 371–374.

* cited by examiner

Primary Examiner—Frank G. Font
Assistant Examiner—Timothy Rude
(74) Attorney, Agent, or Firm—McKenna Long & Aldridge LLP

(57) ABSTRACT

A liquid crystal display device that uses in-plane switching is capable of eliminating a stain generated at an outer area of a thin film transistor array and minimizing a time delay of a common voltage applied to a thin film transistor array. In the device, a plurality of data lines apply data signals to a thin film transistor array. A plurality of gate lines apply gate signals to the thin film transistor array. A plurality of common voltage lines apply a common voltage to the thin film transistor array. The common voltage lines are provided at the outer area of the thin film transistor array and are spaced from the thin film transistor array by a distance of more than 1 to 1.5 mm. A plurality of dummy signal lines are arranged in parallel to the common voltage lines and adjacent to the common voltage lines provided at the outer area of the thin film transistor array to apply alternating current signals.

16 Claims, 7 Drawing Sheets

IN-PLANE SWITCHING MODE LIQUID CRYSTAL DISPLAY DEVICE WITH PERIPHERAL CIRCUIT LINES FOR SHIELDING

This application claims the benefit of Korean Patent Application No. P00-60821, filed on Oct. 16, 2000, which is hereby incorporated by reference for all purposes as if fully set forth herein.

BACKGROUND OF THE INVENTION

1. Field of the Invention

This invention relates to a liquid crystal display device, and more particularly to a liquid crystal display device that is capable of eliminating a stain generated at an outer area of a thin film transistor array using an in-plane switching mode. The present invention also is directed to a liquid crystal display device that is capable of minimizing a time delay of a common voltage applied to a thin film transistor array area.

2. Discussion of the Related Art

Generally, a liquid crystal display of active matrix driving system uses thin film transistors (TFTs) as switching devices to display a natural moving picture. Since such a liquid crystal display can be made into a device that is smaller than a cathode ray tube (CRT), it is commercially available for use in monitors such as portable televisions, notebook personal computers and laptop personal computers, etc.

The active matrix liquid crystal display (LCD) displays a picture corresponding to video signals, such as television signals, on a pixel (or picture element) matrix having pixels arranged at each crossing of gate lines and data lines. Each pixel includes a liquid crystal cell for controlling transmitted light quantity in accordance with a voltage level of a data signal from a data line. The TFT is installed at the crossing of the gate line and the data line to switch a data signal to be transferred to the liquid crystal cell in response to a scanning signal (i.e., a gate pulse) from the gate line.

Such a liquid crystal display (LCD) can be largely classified as a twisted nematic (TN) mode, in which a vertical electric field is applied, or as an in-plane switching (IPS) mode, in which a horizontal electric field is applied to have a wide viewing angle. Which classification applies to the LCD depends on the direction of an electric field driving a liquid crystal.

The IPS mode LCD has an advantage over the TN mode LCD in that a liquid crystal within a pixel area is rotated in the horizontal direction by a horizontal electric field to have a wide viewing angle.

Referring to FIG. 1, the IPS mode LCD includes a TFT 50 provided at an intersection between a data line 52 and a gate line 54, pixel electrodes 48 arranged in a matrix in a pixel area between the data line 52 and the gate line 54, and a common electrode 35 formed in parallel to the pixel electrodes 48 in the pixel area. As shown in FIG. 2, the TFT 50 is provided on a rear substrate 32. The TFT 50 includes a gate electrode 34 connected to the gate line 54, a source electrode 42 connected to the data line 52, a drain electrode 44 connected to the pixel electrode 48, and an active layer 38 defining a channel between the source electrode 42 and the drain electrode 44.

The gate electrode 34, the gate line 54 and the common electrode 35 are formed by depositing a metal such as chrome (Cr), etc. on the rear substrate 32 and then patterning it. Herein, the common electrode 35 is patterned into a plurality of strips within the cell area. A gate insulating film 36 made from an inorganic dielectric material such as $SiN_x$, etc. is entirely deposited on the rear substrate 32 provided with the gate electrode 34, the gate line 54 and the common electrode 35. Semiconductor layers consisting of the active layer 38 made from amorphous silicon (a-Si) and an ohmic contact layer 40 made from a-Si doped with n+ ions are disposed sequentially on the gate insulating film 36. Then, the source electrode 42, the drain electrode 44 and the data line 52 made from a metal material are provided to cover the semiconductor layers 38 and 40. In this case, the source electrode 42 and the drain electrode 44 are patterned in such a manner to be spaced by a predetermined channel width from each other. Thereafter, indium-tin-oxide (ITO) is deposited and then patterned to form the pixel electrode 48. Herein, the pixel electrode 48 is connected to the drain electrode 44 and is patterned into a plurality of strips that partially overlap and alternate with the common electrode 35 within the pixel area. Subsequently, an ohmic contact layer 40 is etched along a channel defined between the source electrode 42 and the drain electrode 44 to expose the active layer 38. A protective film 46 made from $SiN_x$ or $SiO_x$, etc. is entirely deposited on the rear substrate 32 to cover and thus protect the TFT 50 and the pixel electrode 48.

As shown in FIG. 3, the rear substrate 32, which is provided with the TFT array, is opposed to a front substrate 72, which is provided with black matrices 74 and color filters 76. A liquid crystal layer 78 is interposed between the rear and front substrates. When a gate high pulse is applied to the gate electrode 34 of the TFT 50, an electric field corresponding to a difference voltage between a data voltage and a common voltage is applied between the pixel electrode 48 and the common electrode 35 during a scanning period when a channel is defined between the source electrode 42 and the drain electrode 44. Liquid crystal molecules of the liquid crystal layer 78 are driven with the horizontal electric field to control a quantity of transmitted light inputted from a back light.

Referring to FIG. 4, common voltage lines 87 for commonly applying a common voltage from an external driver to the common electrode 35 (FIG. 2) within a TFT array 90 are formed on the rear substrate 32 in parallel to the gate lines 54. The common voltage lines 87 within the TFT array 90 are formed at the outer area adjacent to the TFT array 90 and are connected, via common voltage pads 80, to the external driver. The gate line 54 is connected, via the gate pad 84 and a gate link 86, to the external driver. The gate link 86 formed at the outer area of the TFT array 90 connects the gate line 54 to the gate pad 84 to deliver a gate voltage from the external driver to the TFT array 90. Further, a plurality of data pads 82 and a plurality of data lines 52 for delivering a data voltage to the TFT array 90 are provided on the rear substrate 32. A liquid crystal 78 is injected between the rear substrate 32 and the front substrate 72 over the TFT array area, the gate pad area and the gate link area.

In this case, during the majority of a driving period, liquid crystal 93 at the gate link area is coupled with a direct current voltage caused by a gate voltage applied to the gate link 86 and a common voltage applied to the common voltage line 87 to thereby generate deterioration of liquid crystal.

More specifically, an electric field corresponding to a voltage difference between a data voltage of the pixel electrode 48 and a common voltage of the common electrode 35 (wherein the pixel electrode 48 is horizontally opposed to the common electrode 35 for each cell) is applied to the liquid crystal 78 of the TFT array 90 during a period when a gate high voltage is applied to the gate electrode 34 and is maintained during a period when a gate low voltage is applied. By this horizontal electric field, the liquid crystal 78 is driven for each cell to control a transmitted quantity of a light inputted from the back light. Generally, an electric field having the opposite polarity is applied to the liquid crystal 78 of the TFT array 90 for each frame so as to prevent deterioration of the liquid crystal. On the other hand, a voltage difference between a common voltage 5V and a gate voltage (i.e., a gate high voltage of +20V or a gate low voltage of −5V) is applied to the liquid crystal injected into an area at which the gate link 86 crosses the common voltage line 87 in the outer area of the TFT array 90. More specifically, a gate high voltage of about +20V is applied to each gate line 54 for a relatively short time during one frame period. A gate low voltage of about −5V is supplied in the remaining portion of the frame period, which is the majority of the frame period. Thus, a direct current voltage, which is a voltage difference between the common voltage and the gate low voltage, is applied to the liquid crystal at an area where the gate link 86 crosses the common voltage line 87 during most period to thereby cause deterioration of liquid crystal with the lapse of time. Moreover, the deteriorated liquid crystal in the gate link area is diffused into the liquid crystal in the vicinity of the edge of the TFT array 90. This is because the common voltage line 87 crossing the gate link 86 is adjacent to the TFT array 90. As a result, a stain is generated at the periphery of the LCD because of such liquid crystal deterioration thus degrading picture quality and reliability.

Furthermore, in the conventional LCD device, a large number of common voltage lines 87 are commonly connected to a small number of common voltage pads 80 as shown in FIG. 4. For this reason, length of the common voltage line 87 connected to the common voltage pad 80 is large thus causing a time delay problem upon application of a common voltage. In other words, a voltage difference is generated between a common voltage on the common voltage line 87 close to the common voltage pad 80 and a common voltage on the common voltage line 87 distant from the common voltage pad 80. As a result, a liquid crystal driving according to a data voltage is not smooth and thus degrades picture quality and reliability.

SUMMARY OF THE INVENTION

Accordingly, the present invention is directed to an in-plane switching mode liquid crystal display device that substantially obviates one or more of the problems due to limitations and disadvantages of the related art.

It is an object of the present invention to provide a liquid crystal display device that is capable of preventing deterioration of liquid crystal generated in the outer area of an IPS mode TFT array.

A further object of the present invention is to provide a liquid crystal display device that is capable of minimizing a time delay of a common voltage applied to a TFT array area.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other objects of the invention, an in-plane switching mode liquid crystal display device according to an embodiment of the present invention includes a plurality of data lines for applying data signals to a thin film transistor array; a plurality of gate lines for applying gate signals to the thin film transistor array; and a plurality of common voltage lines for applying a common voltage to the thin film transistor array, wherein the common voltage lines provided at the outer area of the thin film transistor array in the plurality of common voltage lines are spaced by a distance of more than 1 to 1.5 mm from the thin film transistor array. The common voltage lines provided at a gate link area of the outer area of the thin film transistor are spaced by a distance of more than 1 to 1.5 mm from the thin film transistor array.

An in-plane switching mode liquid crystal display device according to another embodiment of the present invention includes a plurality of data lines for applying data signals to a thin film transistor array; a plurality of gate lines for applying gate signals to the thin film transistor array; a plurality of common voltage lines for applying a common voltage to the thin film transistor array; and a plurality of dummy signal lines, being arranged in parallel to the common voltage lines at both sides of the common voltage lines provided at the outer area of the thin film transistor array, for applying alternating current signals. The dummy signal lines are supplied with alternating current signals whose polarity is inverted for each frame like the data signals. A plurality of common voltage pads for applying a common voltage signal from an external driving circuit to the common voltage lines and a plurality of dummy signal pads for applying alternating current signals from an external driving circuit to the dummy signal lines are formed at a data pad area provided with data pads connected to the data lines and a gate pad area provided with gate pads connected to the gate lines.

It is to be understood that both the foregoing general description and the following description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

These and other objects of the invention will be apparent from the following detailed description of the embodiments of the present invention with reference to the accompanying drawings.

Figure 1:
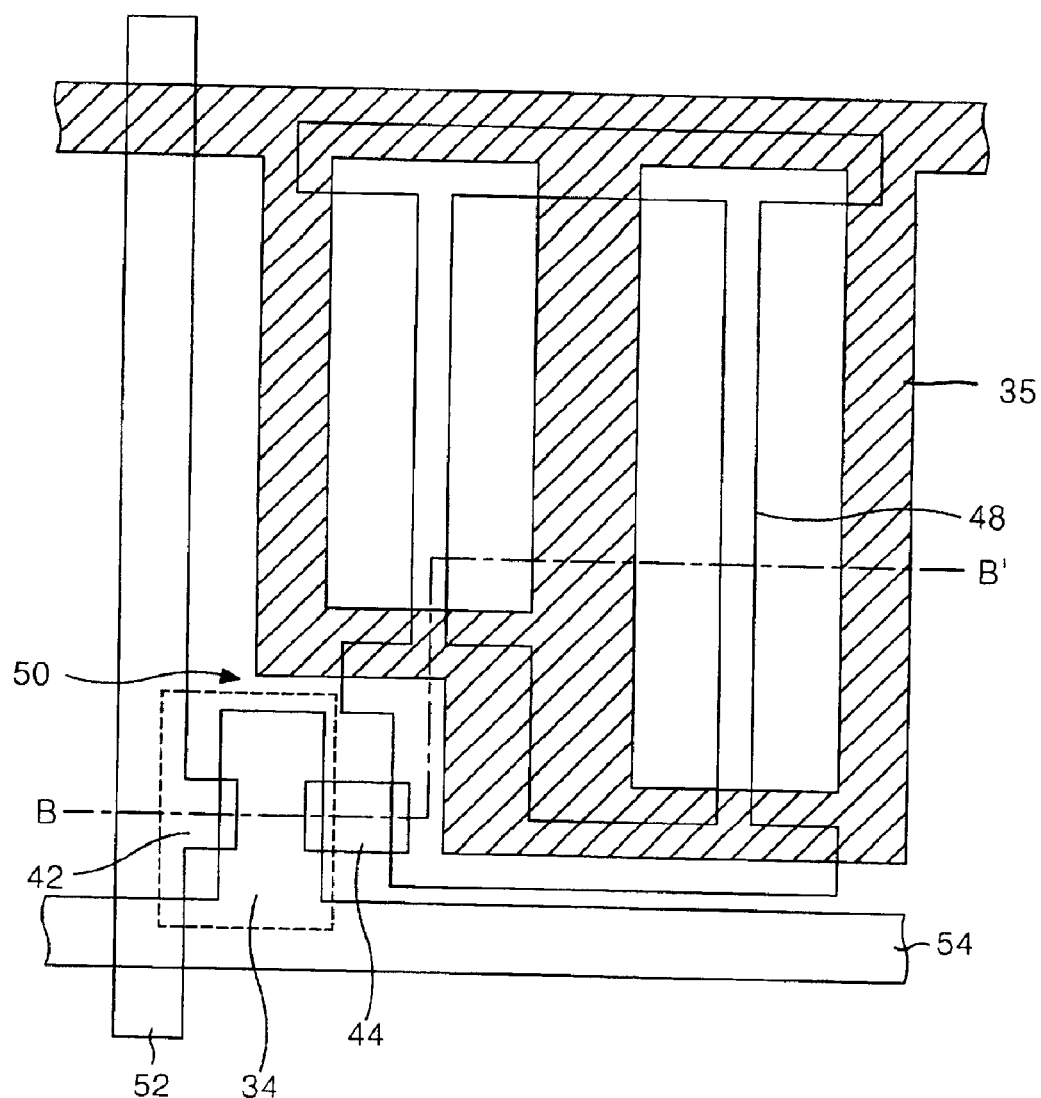
Figure 2:
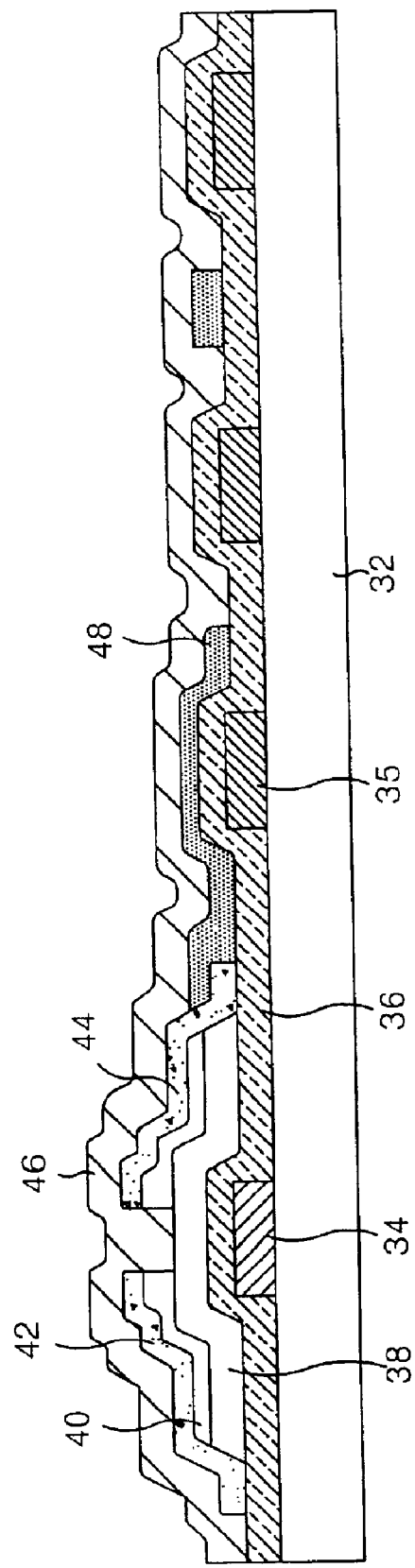
Figure 3:
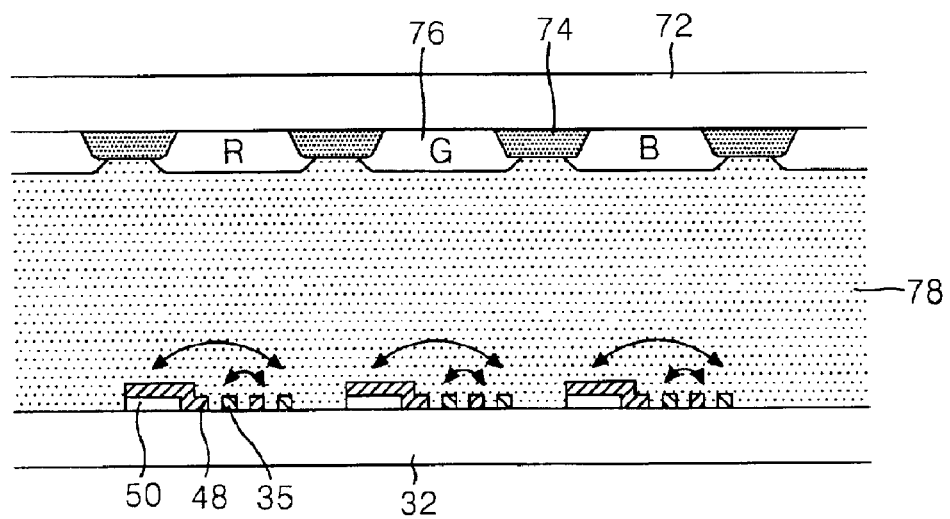
Figure 4:
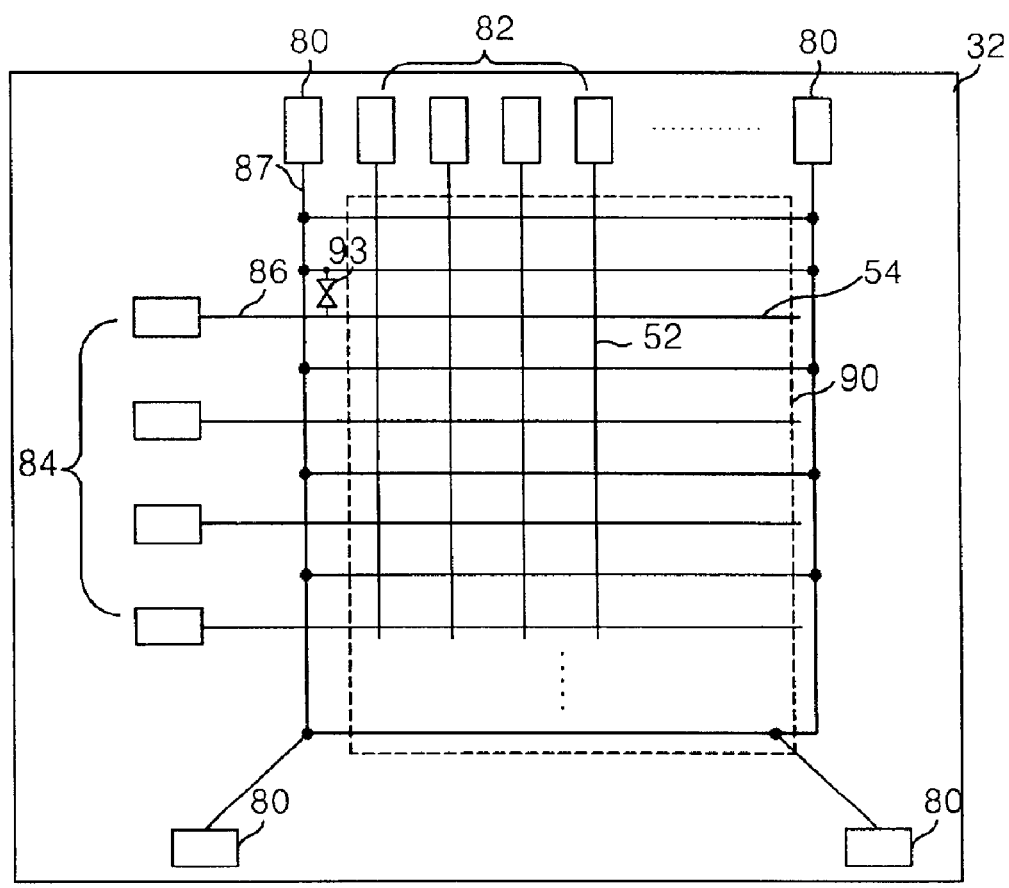
Figure 5:
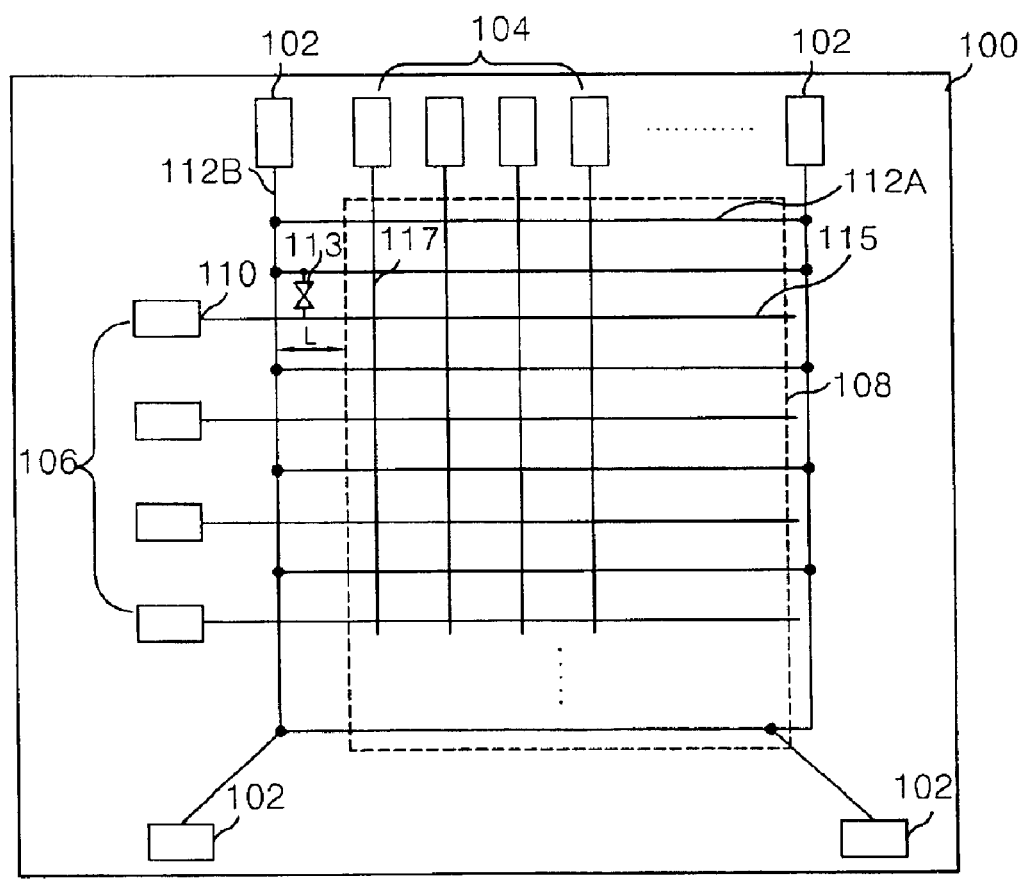
Figure 6:
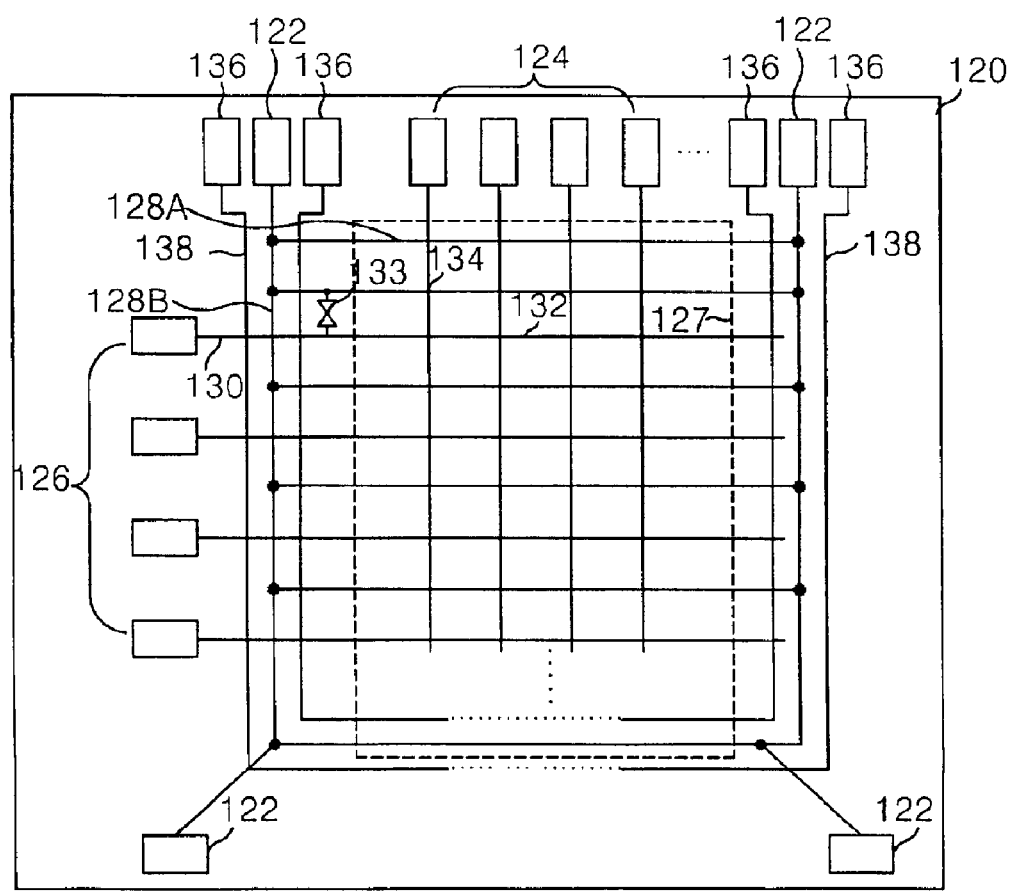
Figure 7:
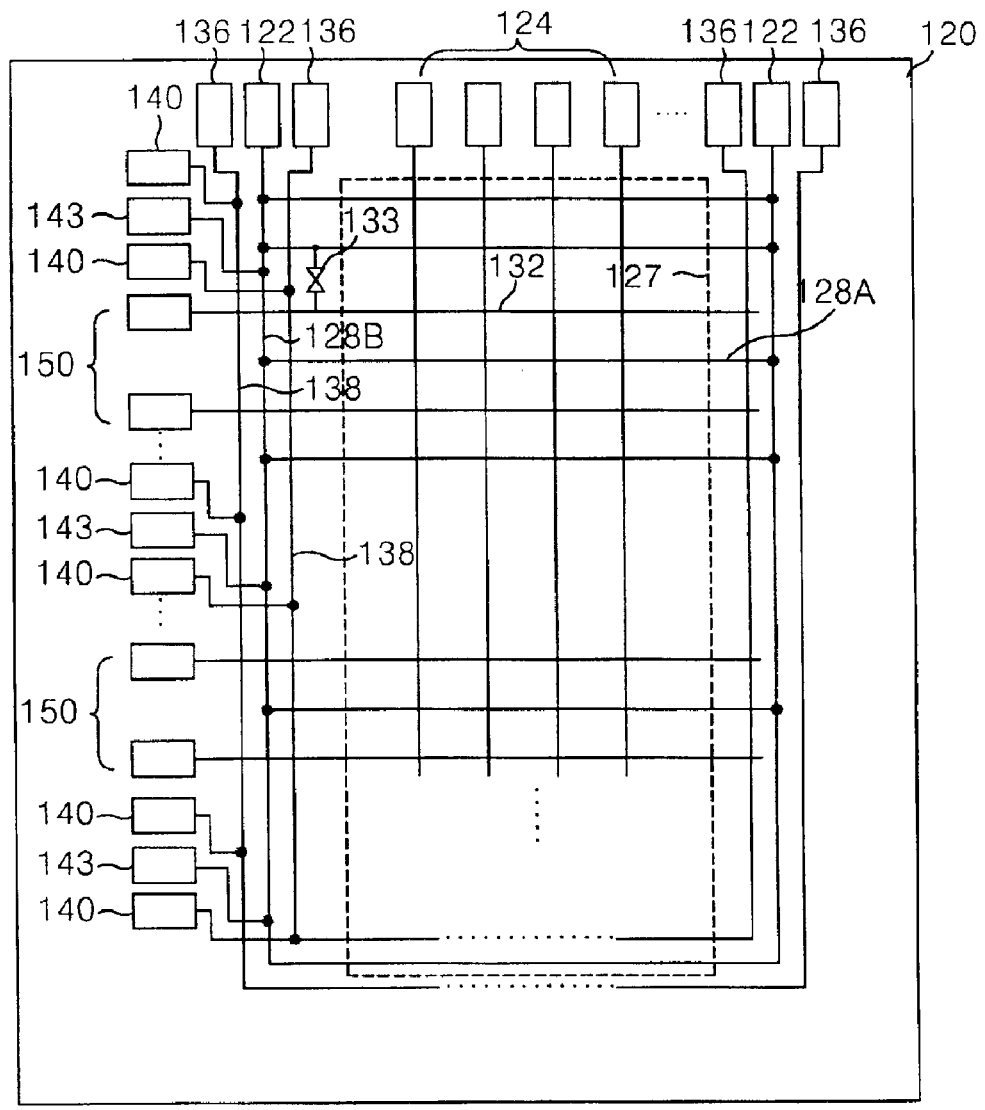

FIG. 1 is a plan view showing a structure of a conventional IPS mode LCD device;

FIG. 2 is a sectional view of the LCD device taken along the B—B' line in FIG. 1;

FIG. 3 is a sectional view representing a driving characteristic of the LCD device shown in FIG. 1;

FIG. 4 is a schematic plan view showing an electrode arrangement of the LCD device shown in FIG. 1;

FIG. 5 is a schematic plan view showing an electrode arrangement of a LCD device according to a first embodiment of the present invention;

FIG. 6 is a schematic plan view showing an electrode arrangement of a LCD device according to a second embodiment of the present invention; and FIG. 7 is a schematic plan view showing an electrode arrangement of a LCD device according to a third embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Referring to FIG. 5, there is shown a liquid crystal display (LCD) device according to a first embodiment of the present invention. The LCD device includes a TFT array 108 on a rear substrate 100 for displaying a picture, a plurality of common voltage pads 102 and a plurality of voltage lines 112A and 112B for applying a common voltage from the exterior to the TFT array 108, and a plurality of gate pads 106 and a plurality of gate lines 115 for applying a gate voltage from the exterior to the TFT array 108, and a plurality of data pads 104 and a plurality of data lines 117 for applying a data voltage from the exterior to the TFT array 108.

In FIG. 5, the gate pads 106 connected to an external driver are connected, via a gate links 110, to the gate lines 115 within the TFT array 108. The common voltage lines 112A are formed in parallel to the gate lines 115 within the TFT array 108. The common voltage lines 1122 within the TFT array 108 are commonly connected by the common voltage lines 112B crossing the gate links 110 provided at the outer area of the TFT array 108. In particular, the common voltage lines 112B formed in a direction crossing the gate links 110 at the exterior of the TFT array 108 have a spaced distance L more than 1 to 1.5 mm from the TFT array 108. Accordingly, even when deterioration of liquid crystal caused by a difference voltage between the common voltage and the gate voltage is generated in a liquid crystal 113 in an area where the gate link 110 crosses the common voltage line 112, it is not diffused into the TFT array 108. As a result, it becomes possible to prevent a stain caused by deterioration of liquid crystal at the outer area of the TFT array 108.

Referring to FIG. 6, there is shown a liquid crystal display (LCD) device according to a second embodiment of the present invention. The LCD device includes a TFT array 127 for displaying a picture on a rear substrate 120, a plurality of common voltage pads 122 and a plurality of voltage lines 128A and 128B for applying a common voltage from the exterior to the TFT array 127, and a plurality of gate pads 126 and a plurality of gate lines 132 for applying a gate voltage from the exterior to the TFT array 127, a plurality of data pads 124 and a plurality of data lines 134 for applying a data voltage from the exterior to the TFT array 127, and a plurality of dummy signal lines 138 provided in parallel to both sides of the common voltage lines 128 at the exterior of the TFT array 127.

In FIG. 6, the common voltage lines 128A are formed in parallel to the gate lines 132 within the TFT array 127. The common voltage lines 128A within the TFT array 127 are commonly connected by the common voltage line 128B provided at the exterior of the TFT array 127. The dummy signal lines 138 formed in parallel to both sides of the common voltage line 128B at the exterior of the TFT array 127 supply data signals identical to the data pads 124 by way of dummy pads 136 provided in parallel to the common voltage pads 122. In other words, the dummy signal lines 138 supply alternating current signals inverted for each frame like data signals applied, via the data pads 124, to the data lines 134. Accordingly, an alternating current voltage is applied to a liquid crystal 133 injected the outer area of the TFT array 127 like the liquid crystal within the TFT array 127, so that deterioration of liquid crystal caused by a direct current voltage in the prior art can be prevented.

Referring to FIG. 7, there is shown a liquid crystal display (LCD) device according to a third embodiment of the present invention. The LCD device shown in FIG. 7 includes the same elements as the LCD device shown in FIG. 6 except that a plurality of second common voltage pads 143 and a plurality of second dummy pads 140 are provided at a gate pad area 150.

In FIG. 7, the first common voltage pads 122 are provided in the data pad area 124, while the second common voltage pads 143 are provided in the gate pad area 150, to thereby apply a common voltage from the exterior to the common voltage lines 128A and 128B, thereby reducing a delay time of a common voltage caused by a length of the common voltage lines 128A and 128B. Further, the first dummy pads 136 are provided in the data pad area 124, while the second dummy pads 140 are provided in the gate pad area 150, to thereby apply an alternating current voltage from the exterior to the dummy signal lines 138, which are provided at both sides of the common voltage lines 128B at the outer area of the TFT array 127. The second common voltage pads 143 and the second dummy pads 140 are arranged between groups of a plurality of gate pads 150 (e.g., 10 gate pads).

The dummy signal lines 138 arranged in parallel to both sides of the common voltage lines 128B at the exterior of the TFT array 127 supply alternating current signals inverted for each frame like data signals. Accordingly, an alternating current voltage is applied to the liquid crystal 133 in the outer area of the TFT array 127, like the liquid crystal of the TFT array 127, so that deterioration of liquid crystal caused by a direct current voltage in the prior art can be prevented.

As described above, according to the present invention, the common voltage lines are provided at a spaced distance of about 1 to 1.5 mm from the TFT array in the outer area of the TFT array, so that it becomes possible to prevent a deterioration of liquid crystal caused by a gate voltage and a common voltage from being diffused into the TFT array. Also, alternating current signals identical to data signals are applied to the dummy signal lines arranged in parallel to the common voltage lines at the outer area of the TFT array, thereby preventing a deterioration of liquid crystal. Accordingly, a stain at the periphery of the TFT array caused by the deterioration of liquid crystal can be eliminated. Furthermore, a plurality of common voltage pads is provided in the data pad area as well as in gate pad area, so that a time delay of the common voltage can be minimized.

It will be apparent to those skilled in the art that various modifications and variations can be made in the present invention without departing from the spirit and scope of the invention. Thus, it is intended that the present invention cover the modifications and variations of this invention provided they come within the scope of the appended claims and their equivalents.

What is claimed is:

1. An in-plane switch mode liquid crystal display device comprising:
    a plurality of data lines for applying data signals to a thin film transistor array;
    a plurality of gate lines for applying gate signals to the thin film transistor array;
    a plurality of common voltage lines for applying a common voltage to the thin film transistor array; and
    a plurality of dummy signal lines parallel to the common voltage lines and adjacent to the common voltage lines for applying alternating current signals.

2. The liquid crystal display device according to claim 1, wherein the dummy signal lines are supplied with alternating current signals whose polarity is inverted for each frame.

3. The liquid crystal display device according to claim 1, wherein a plurality of common voltage pads for applying a common voltage signal from an external driving circuit to the common voltage lines are formed in a data pad area provided with data pads connected to the data lines and in gate pad area provided with gate pads connected to the gate lines.

4. The liquid crystal display device according to claim 1, wherein a plurality of dummy signal pads for applying alternating current signals from an external driving circuit to the dummy signal lines are formed in a data pad area provided with data pads connected to the data lines.

5. The liquid crystal display device according to claim 1, wherein a plurality of dummy signal pads for applying alternating current signals from an external driving circuit to the dummy signal lines are formed in a gate pad area provided with gate pads connected to the gate lines.

6. An in-plane switching mode liquid crystal display device, comprising:

a plurality of data lines for applying data signals to a thin film transistor array;

a plurality of gate lines for applying gate signals to the thin film transistor array;

a plurality of common voltage lines for applying a common voltage to the thin film transistor array; and at least one dummy data line, parallel to said data lines, for applying a compensation signal, wherein the common voltage lines provided outside the thin film transistor array, and wherein the common voltage lines are spaced a predetermined distance from the thin film transistor array.

7. The in-plane switching liquid crystal display device of claim 6, wherein the dummy data line is outside the data lines of the thin film transistor array.

8. The in-plane switching liquid crystal display device of claim 6, wherein the dummy data line is between the common voltage lines and the data lines.

9. The in-plane switching liquid crystal display device of claim 6, wherein the at least one dummy data lines includes a first dummy data line, adjacent to and parallel to the common voltage line.

10. An in-plane switching mode liquid crystal display device of claim 9, wherein the first dummy data is between the common voltage line and the thin film transistor array.

11. The in-plane switching mode liquid crystal display device of claim 9, wherein the at least one dummy data lines includes a second dummy data line, adjacent to and parelle to the common voltage line.

12. The in-plane switching mode liquid crystal display device of claim 11, wherein the second dummy data line is on a side of the common voltage line opposite the thin film transistor array.

13. The in-plane switching mode liquid crystal display device of claim 6, wherein the compensation signal has a low voltage and a high voltage, wherein the low voltage is equal to the common voltage minus a predetermined voltage and the high voltage is equal to the common voltage plus the predetermined voltage.

14. The in-plane switching mode liquid crystal display device of claim 13, wherein the low voltage 0 and the high voltage is 10V.

15. The in-plane switching mode liquid crystal display device of claim 6, wherein the compensation signal varies according to the common voltage such that the compensation signal has an average voltage equal to the common voltage.

16. The in-plane switching liquid crystal display of claim 6, wherein the compensation signal is an alternating signal centered on the common voltage.

* * * * *